Jan. 5, 1965      A. ELMENDORF      3,164,511
ORIENTED STRAND BOARD
Filed Oct. 31, 1963      4 Sheets-Sheet 1
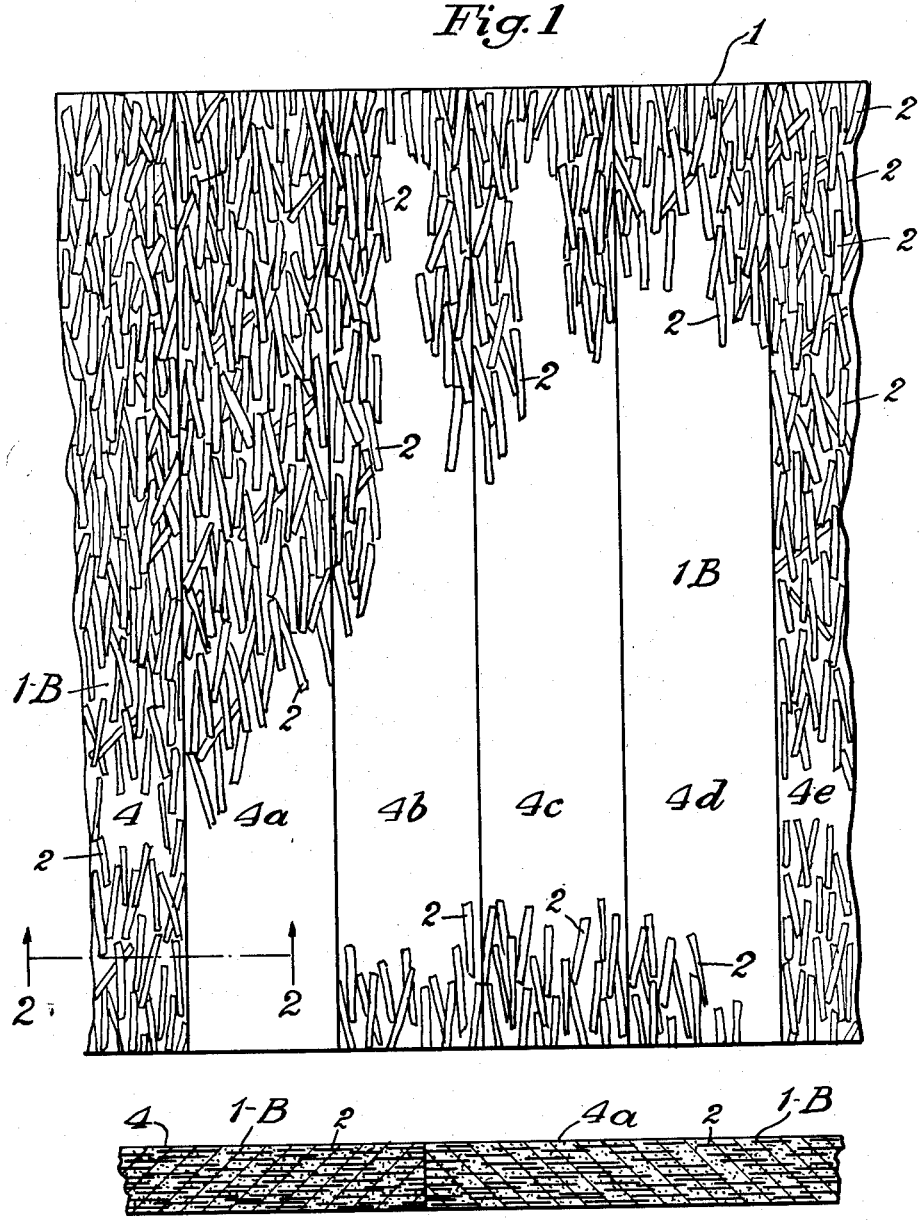
Inventor
Armin Elmendorf
by Parker & Carter
Attorneys

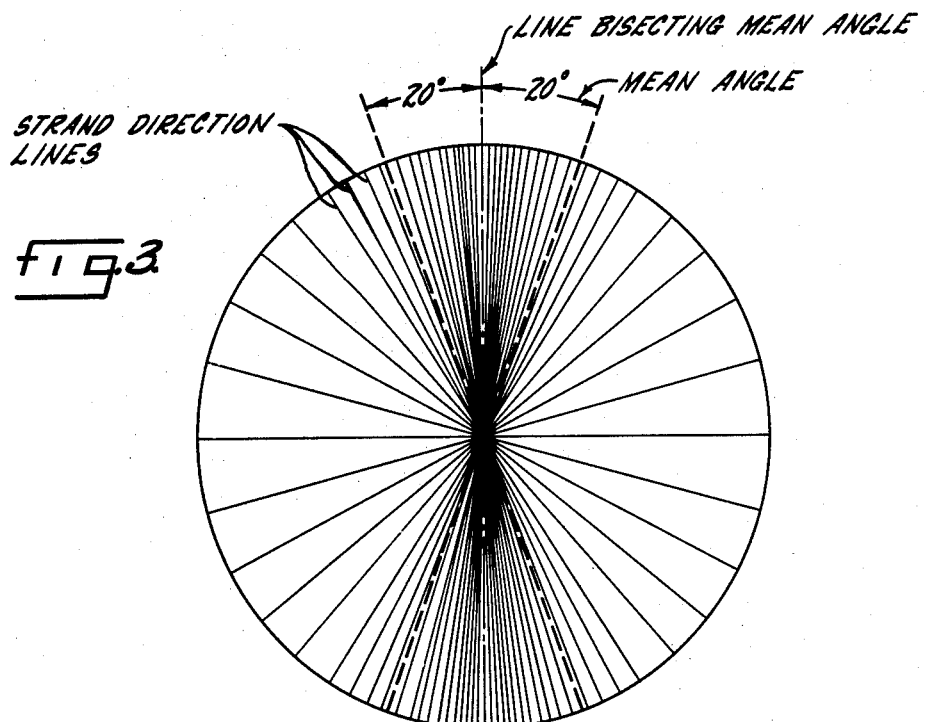
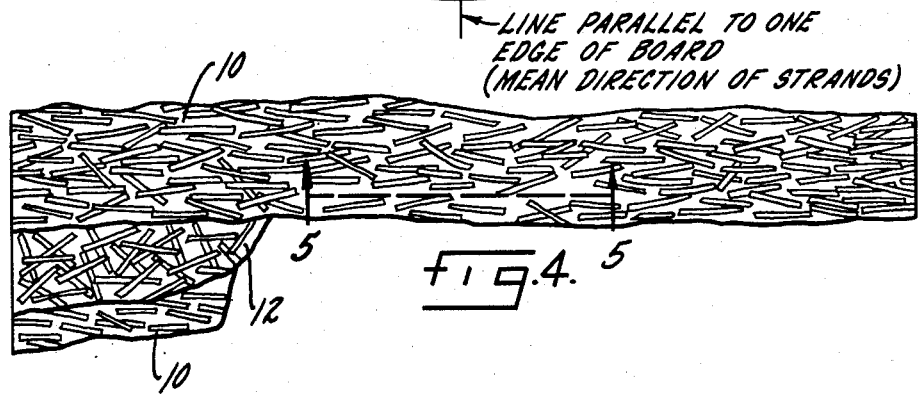
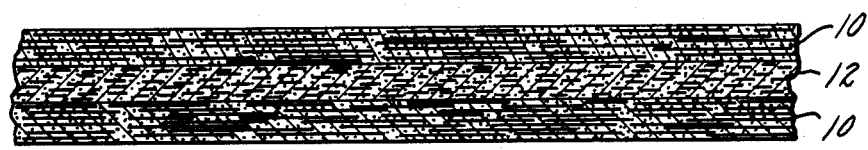

Jan. 5, 1965   A. ELMENDORF   3,164,511
ORIENTED STRAND BOARD
Filed Oct. 31, 1963   4 Sheets-Sheet 4

INVENTOR.
Armin Elmendorf,
BY Parker & Carter
Attorneys.

3,164,511
ORIENTED STRAND BOARD
Armin Elmendorf, 860 Charleston Road, Palo Alto, Calif.
Filed Oct. 31, 1963, Ser. No. 320,331
12 Claims. (Cl. 161—57)

This invention relates to a structural board consisting of generally straight wood strands and a suitable binder. The wood strands may be embedded in a matrix of cement, such as Portland cement, gypsum or magnesite cement, or any one of a number of suitable synthetic resins.

This application is a continuation in part of my copending applications Serial No. 687,914, filed October 3, 1957, now abandoned; Serial No. 710,658, filed January 23, 1958, now abandoned; Serial No. 741,521, filed June 12, 1958, now abandoned; and Serial No. 24,809, filed April 26, 1960, now abandoned.

A major purpose of the present invention is to provide a structural board of the type described which has the strength to compete commercially with plywood in the building industry.

Another purpose is to form a structural board which has a density lower than most hardboards, yet a strength in the direction of its length superior to that of hardboards.

Another purpose is to form a structural board of the type described which is uniform in its physical properties and which can be formed in lengths and widths independent of log sizes.

Other purposes will appear in the ensuing specification, drawings and claims.

Figure 6:
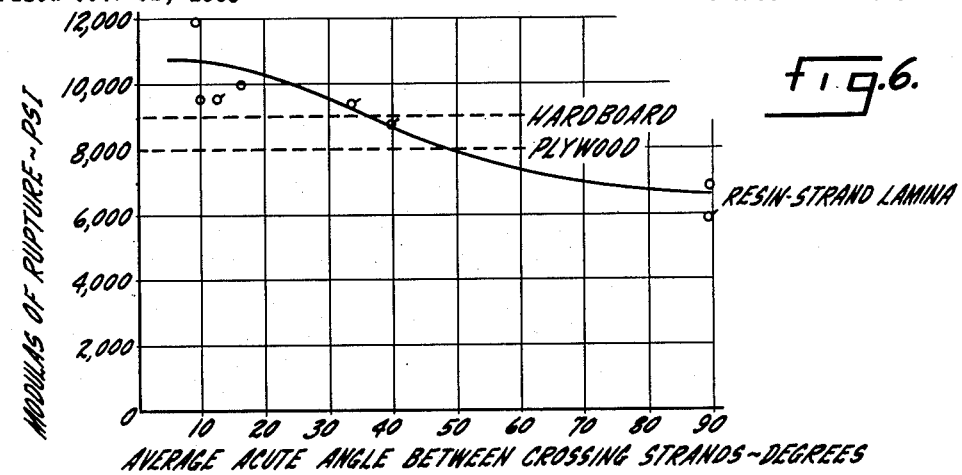
Figure 7:
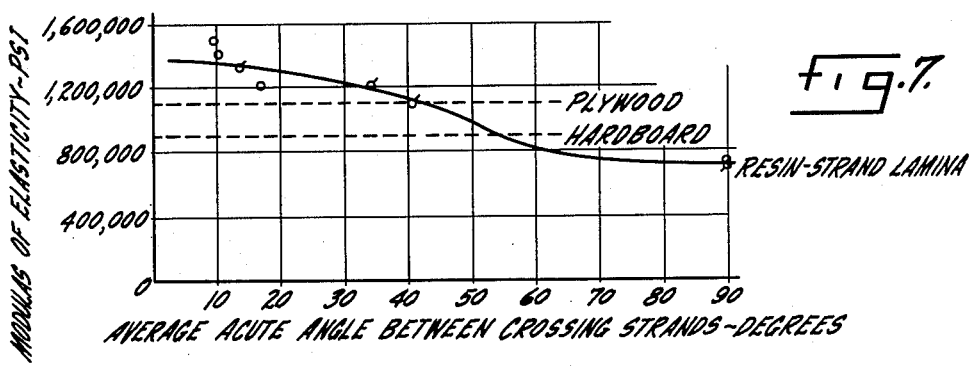
Figure 8:
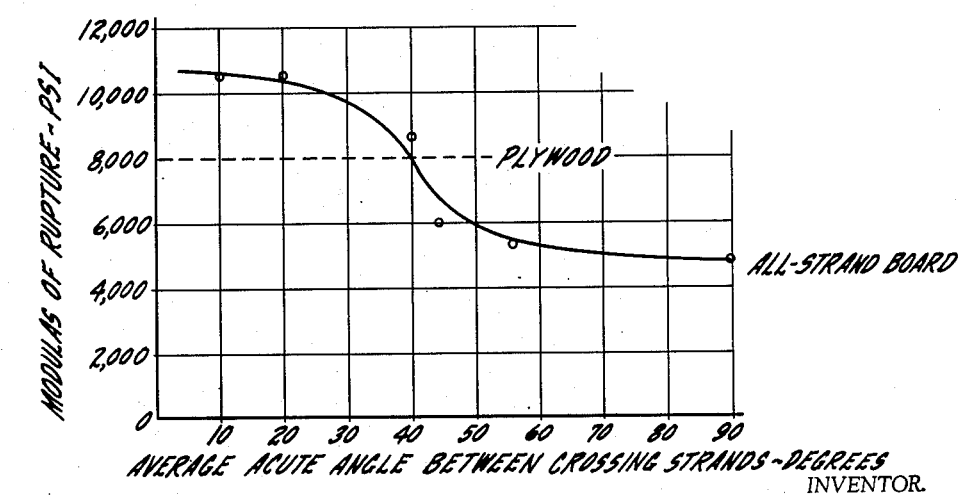
Figure 9:
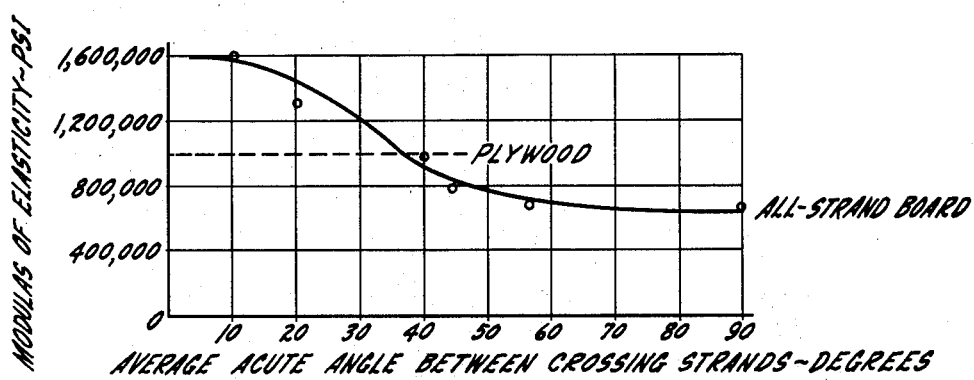
Figure 10:
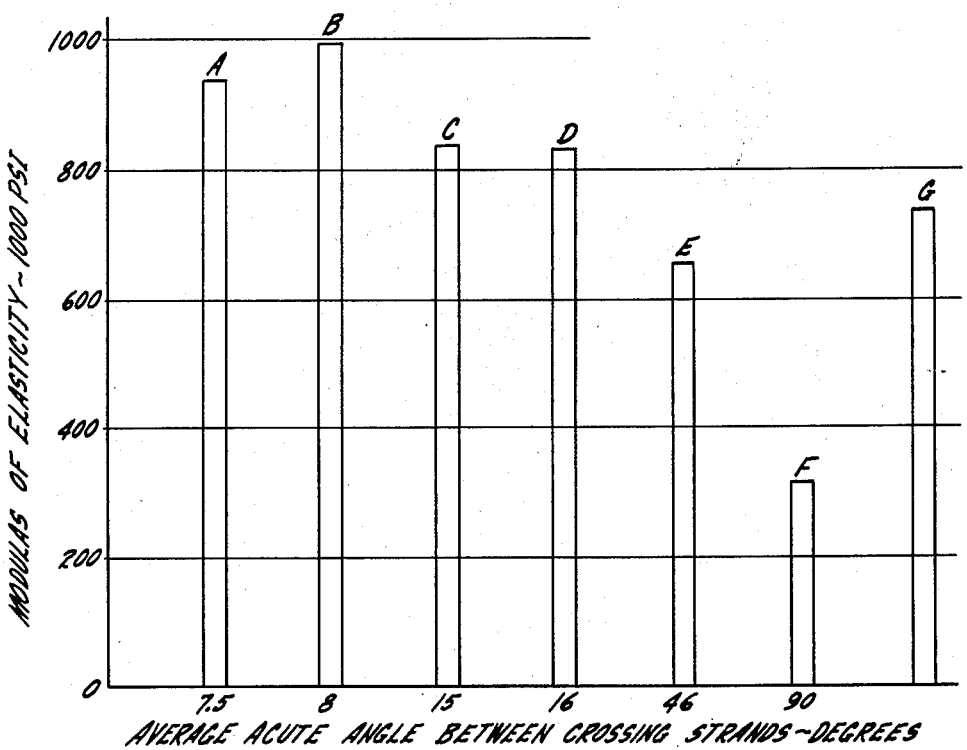

The invention is illustrated diagrammatically in the following drawings wherein:

FIGURE 1 is a plan view of one form of structural board formed in accordance with the present invention, FIGURE 2 is a section, on an enlarged scale, along plane 2—2 of FIGURE 1, FIGURE 3 illustrates diagrammatically the strand distribution in a board of the present invention, FIGURE 4 is a partial plan view of a second form of structural board formed in accordance with the present invention, FIGURE 5 is a section, on an enlarged scale, along plane 5—5 of FIGURE 4, FIGURE 6 is a graph illustrating the variations in modulus of rupture with variations in the average angle between crossing strands, FIGURE 7 is a graph, similar to FIGURE 6, illustrating the variations in modulus of elasticity with variations in the average angle between crossing strands, FIGURE 8 is a graph, similar to FIGURE 6, but for a second form of structural board, FIGURE 9 is a graph, similar to FIGURE 7, but for a second form of structural board, FIGURE 10 is a bar graph illustrating the variations in modulus of elasticity with variations in the average acute angle between crossing strands for a board formed with a cement matrix.

Each of the structural boards formed in accordance with the present invention is preferably composed of a plurality of strand-like straight wood shavings or strands suitably bonded together. The strands each consist of a multiple number of the fibers of which wood is composed, the fibers being in the same position with respect to one another that they occupy in the original wood. The strands are positioned relative to each other in a manner which is hereinafter referred to as "parallel orientation." By the term "parallel orientation" I mean that most of the strands in a lamina made in accordance with the present invention extend in a direction approaching a line which is parallel to one edge of the lamina.

The term "strands" is employed to define strand-like shavings as herein described. They are generally straight with parallel edges. Strands cut from the edge of rotary-cut veneer have edge grain faces and are of uniform width. Other strands are derived by cutting shavings from the face of the wood block so that the shaving fibers are parallel to the surfaces of the shaving. These are then reduced in width and sometimes also in length so that the resultant narrow shavings are strand-like.

It has been found by trial that perfect parallelism is neither practical of achievement nor desirable from the standpoint of appearance. Crossing of the strands gives the product a woven fabric-like character and increases the strength across the board width. The average acute angle between crossing strands should be less than on the order of about 40 degrees. The mean direction of strands in a lamina is parallel to one edge of the lamina.

In FIGURE 3 each line represents the direction of a certain number of strands as here defined measured at points on a line at right angles to the board length. The heavy dotted lines of FIGURE 3 define the position of the maximum mean of the acute angle the strands make with respect to a line parallel to the board length. This angle is on the order of plus or minus 20 degrees. In other words, parallel orientation of the present invention means that the mean acute angle the strands make with a line parallel to one edge of the lamina must be substantially greater than zero degrees, but less than 20 degrees. Stated in another way, the mean acute angle between strands that cross each other is less than about 40 degrees and substantially all of the strands in a lamina will cross another strand.

"Parallel orientation" is thus distinguished from random orientation where strands or shavings cross each other at an average angle of 90 degrees. In the case of "parallel orientation" the direction of the line bisecting the mean angle extends generally parallel to one edge of the board, whereas, in ideal random distribution, the direction of the line bisecting the mean angle between crossing strands is indeterminate and incapable of specific location.

The strands may have a length which is several times their width. The ratio of length to width may be as low as 3:1, but is preferably higher than 10:1. A practical average width of the strands is 1/32 inch to 1/4 inch. The average thickness of the strands should be on the order of .005 to .020 inch. In any given batch of strands some variation from these ranges may be found in individual strands, but the average width and thickness should be in the range specified. Strands having an average length shorter than 1/2 inch or longer than six inches should be avoided inasmuch as proper orientation of the strands becomes difficult. In any given batch of strands there may be some strands shorter than one-half inch or longer than six inches and this is not disadvantageous as long as they constitute such a minor proportion of all of the strands that the average length does not exceed the limitations stated. It is important that the fibers in the strands be approximately parallel to the surface of the strands. Waste veneer may be employed for conversion into strands by slicing the edges of the veneer, in which case the edges of the strands will be generally parallel to one another and to the fiber direction.

Considering the form of structural board illustrated in FIGURES 1 and 2, the exposed face of the panel or lamina appears at 1B in FIGURE 1. The panels may be of any desired weight and length, commensurate with the requirements of the building industry. Panels or laminae or boards of the present inventory may, as in the case of hardboard, be made up in sheets of standard length, width and thickness.

The lamina is composed of a plurality of strand-like shavings 2. The strands are preferably deposited in generally parallel groups extending side by side as shown by groups 4, 4a, 4b, 4c, 4d and 4e in FIGURE 2. The lamina may be manufactured by depositing binder coated strands on a metal caul. The strands are coated with any suitable adhesive which may be, for example, a synthetic resin or a protein binder. Either a liquid or dry adhesive may be employed. Urea, phenol and melamine resins can be employed as binders. The binder may account for about two to 15 percent of the weight of the lamina. For best results, any fines that may be present in a batch of strands should be screened out before the binder is added since the fines are generally short and require more binder to obtain the same strength, and they do not lend themselves to parallel orientation. The broken particles that pass through a ten mesh screen are generally too fine to be useful. It should be understood, however, that in some cases it may be desirable to separately deposit a layer of particles or fibers, fiber bundles or fine strands on the surface of the lamina, or a layer of resin-impregnated paper may be used in order to obtain a pit-free smooth surface.

The pressures used are preferably such as to compress the strand mat to a density exceeding that of the natural wood. All woods of commercial importance suitable for the lamina of the present invention have a density of below 0.6. The pressures used are therefore those which will produce a density of the board ranging from 0.6 to 0.95.

The temperatures used in consolidating the strands vary with the type of binder employed. It is only necessary to use that temperature which will set the binder. Excessively high temperatures which mar the appearance of the lamina should be avoided. Specific temperatures necessary for setting the aforementioned binders are known to the art and are not set forth herein.

The following tables illustrate the relatively high strength possessed by a single lamina formed in accordance with the present invention. Table 1 gives the modulus of rupture obtained from bending tests made on specimens of various densities. The specimens had a thickness of ⅛ inch and were made in accordance with the present disclosure. The strands used in the lamina were made from Douglas fir veneer and had an average thickness of .007 inch, an average length of 1¼ inch and an average width of ⅛ inch. A phenolic resin binder was employed and the binder accounted for four percent by weight of the strands.

*Table I*

| Laminate density: | Modulus of rupture, p.s.i. |
|---|---|
| .65 | 7,000 |
| .70 | 8,800 |
| .75 | 10,500 |
| .80 | 12,400 |
| .85 | 14,000 |

Table II below further illustrates the high strength possessed by a single lamina formed as disclosed herein. The boards of Table II, however, were made of strands averaging .012 inch in thickness. These boards used Douglas fir veneer strands having an average width of ⅛ inch, an average length of 1¼ inch with four percent phenolic resin. The boards used for the tests in Table II were all ⅛ inch in thickness.

*Table II*

| Laminate density: | Modulus of rupture, p.s.i. |
|---|---|
| .75 | 13,600 |
| .80 | 17,900 |
| .85 | 22,400 |
| .90 | 26,800 |

The foregoing tables show that the modulus of rupture for strand laminae made in accordance with the present invention may vary from 7,000 p.s.i. to 26,800 p.s.i. in the density range of .65 to .90. This is far superior to the modulus of rupture of hardboard which generally ranges from about 5,000 p.s.i. Hardboards have a density ranging from .90 to 1.20. The strength of a lamina of the present invention exceeds the strength of hardboard even though its density is below that of hardboard.

FIGURES 6 and 7 are graphs illustrating the variation in the modulus of elasticity and the modulus of rupture of a single lamina formed as disclosed herein, with changes in the average acute angle between crossing strands. All of the panels tested were 3/16-inch thick and were made of wood strands as defined herein using a phenolic resin binder. The binder accounted for five percent of the weight of the panel. All panels were made under identical pressing conditions and all panels were tested as a simple beam with a center load.

The graphs show the results of tests made on eight specimens, four with hemlock strands and four with Douglas fir strands. As the density of wood varies considerably from place to place in the same block, the strength of the strands cut from the wood also varies considerably. Due to the mixing of the strands while adding the binder, the variation in strength of a specimen is not quite as great as that of the original wood, but some variation must be expected.

Half-inch 5-ply Douglas fir plywood has an average modulus of rupture of approximately 8,000 p.s.i., and tempered hardboard an average modulus of rupture of approximately 9,000 p.s.i. In order that a board product may commercially with plywood and tempered hardboard, it must compare favorably in strength with these two products. The two strength properties of most importance in the board industry are the modulus of rupture, which measures bending strength, and the modulus of elasticity which measures stiffness. FIGURE 6 illustrates that for strand orientation angles greater than about 40 degrees, the modulus of rupture of the lamina is less than that of the above mentioned commercial products. When the angle of orientation is about 40 degrees, the oriented strand lamina has a modulus of rupture slightly under that of hardboard, but greater than that of plywood. For angles smaller than about 40 degrees, the strength of the lamina exceeds that of these two products. Note that when the orientation angle of the strands in the lamina becomes progressively greater than 40 degrees, the strength decreases.

FIGURE 7 shows the effect of strand orientation on the modulus of elasticity or stiffness of a board. The average modulus of elasticity for one-half inch 5-ply Douglas fir plywood is about 1,100,000 p.s.i. Tempered hardboard has an average modulus of elasticity of 900,000 p.s.i. FIGURE 7 illustrates that when the average angle between crossing strands is about 40 degrees, the modulus of elasticity of the lamina is about 1,100,000 p.s.i. hence, about the same as that of plywood and somewhat greater than that of tempered hardboard. With an average angle less than about 40 degrees, the modulus of elasticity of the oriented strand lamina exceeds that of both plywood and hardboard.

The structural board illustrated in FIGURES 4 and 5 differs from that illustrated in FIGURE 1 in that the board is composed of a plurality of laminae, with the outer laminae being oriented as described in connection with the board of FIGURES 1 and 2. Preferably the direction of orientation of the outer laminae are parallel and the intermediate lamina or laminae may be oriented across the direction of the face layers or the strands may be randomly disposed in the interior or intermediate laminae or lamina. For example, in FIGURE 5 the outer laminae may be indicated at 10 and an intermediate lamina is indicated at 12. The strands in both the core lamina or laminae as well as the outer facing laminae may be of the type described above in connection with the structural board of FIGURES 1 and 2. The same binder may be used throughout all of the laminae. What is important is that the directions of the lengths of the strands in the intermediate lamina or core be different from the direction of the strands in the outer laminae. The strands in the core may be randomly disposed and many of them extend across the orientation of the strands in the face laminae. Preferably, the density of the core is less than that of the face or surface laminae.

The pressures and temperatures used in forming the board illustrated in FIGURES 4 and 5 are substantially the same as those used in the board of FIGURES 1 and 2. The density of the faces will generally range from 0.6 to 0.95.

While many variations of detail are, of course, possible, I may indicate as a specific example a three-layer structural board, which I have made as follows:

The intermediate layer consisted of randomly distributed strands. The two facing layers consisted of oriented strands, and were made as follows:

Strand size: Width from about 1/16 inch to 3/16 inch. Length ranging from 1 inch to 1¼ inch. Thickness averaged about 0.012 inch.

Resin binder: Phenol-formaldehyde resin was used as binder with 6% resin solids on face strands and 4% on core strands. Resin binder was applied by spraying in a rotating drum.

Thickness and weight of components: The thickness of each loosely felted face mat was about 1¼ inch. The thickness of the loosely felted core mat was about 3 inches. Overall thickness of the three layered mat was about 5½ inches. The 3-ply assembly was pre-pressed momentarily at 100 p.s.i. and room conditions. The thickness, after pre-pressing, was about 1½ inches. After consolidation in a hot press, the thickness of the panel was 0.37 inch. The panel so made weighed 1.5 lbs. per square foot, and had a specific gravity of 0.78. The weight of the material used for each face was 0.39 lb. per square foot, and for the core the weight of the material was 0.72 lb. per square foot.

Each face of the consolidated panel was about 0.080 inch thick, and had a specific gravity of about 0.94. Thickness of core was about 0.21 inch, and had a specific gravity of 0.66. At the time of formation the face strands had a moisture content in the range of 14 to 18%, and the core strands had a moisture con-content of 7 to 9%.

Consolidation: The 3-layered mat carried on a metal caul was pressed in a hot press. The temperature of the press platens was about 320°. A pressure of 200 p.s.i. was applied and maintained until ⅜-inch stops were reached. Pressure was maintained to stop thickness until a total time of 9 minutes had elapsed, whereupon the consolidated panel was removed from the press.

Results of tests: The panel made as described was tested in cross-bending with the following results:
 (a) Specific gravity of 0.78.
 (b) Weight of 1.5 lbs. per square foot.
 (c) Thickness of 0.37 inch.
 (d) Modulus of rupture of 11,000 p.s.i. tested with oriented direction of face strands across supports.
 (e) Modulus of elasticity of 1,400,000 p.s.i. tested with oriented direction of face strands across supports.
 (f) Moisture content of 6% at test.

The graphs of FIGURES 8 and 9 illustrate the relationship between the strength of a three-ply board formed in accordance with the present invention and the average acute angle between crossing strands. All the panels tested were one-half inch thick and were made of wood strands as defined herein, using a phenolic resin binder which accounted for approximately five percent of the weight of the board. The strands in the outer laminae were oriented as described herein. The strands in the core were randomly disposed. All panels were made under identical pressing conditions. The specimens were all tested as a simple beam with a center load.

FIGURE 8 shows that for strand orientation angles greater than about 40 degrees, the modulus of rupture of the panel is less than that of half-inch 5-ply plywood. When the angle of orientation is about 40 degrees, the panel has a modulus of rupture approximating that of plywood. For average angles smaller than about 40 degrees, the strength of the panel exceeds that of plywood. When the average angle of orientation of the strands in the panel becomes progressively greater than 40 degrees, the strength decreases.

FIGURE 9 shows the effect of strand orientation on the modulus of elasticity or stiffness of the panel. The modulus of elasticity of Douglas fir plywood, as described above, is about 1,100,000 p.s.i. When the angle between crossing strands is approximately 40 degrees, the modulus of elasticity of the panel is slightly less than 1,100,000 p.s.i., or roughly the same as plywood. For angles of less than about 40 degrees, the modulus of elasticity of the oriented strand board exceeds plywood.

FIGURES 1, 2, 4 and 5 may also illustrate a third form of the invention or a third board. In general, an entirely different type of structural board may be formed by substituting an inorganic cement for the resin binders described above.

The strands in the board are preferably embedded in a matrix of an inorganic cement, such as Portland cement, gypsum or magnesite cement. The ratio of the weight, on a dry basis, of the strands in the board, to the weight of cement may vary from about 1:2 up to about 1:10. Sawing of the board is facilitated by using a lesser amount of cement while the strength of the product is increased by utilizing an increased amount of cement up to the above mentioned ratio of 1:10 after which there is little increase in strength by reducing the ratio of fiber to cement weight. Portland cement is preferred as the matrix material where weather resistance is important.

The strands cut from some woods contain constituents that retard the setting of Portland cement. In such cases the strands are first leached with hot water to remove the retarding substances. For that reason, woods that contain sugars, such as larch, should be leached before they are used.

The strands utilized in the board are preferably used in the green state, and if in the green state they do not contain a sufficient amount of moisture, moisture must be added. A preferred ratio of the weight of moisture in and on the strands to the weight of the dry strands, ranges from about 130:100 up to about 240:100. If the strands contain less than the optimum amount of moisture, moisture may be sprayed on the strands before adding the cement. Conventional mixing equipment, such as a rotary concrete mixer, may be utilized to coat the wet strands with the cement.

Preferably the green or wet strands, after they have been leached if necessary, and additional moisture added if necessary, are supplied with dry cement. After the strands are coated with the cement they are oriented and deposited on a caul or a series of cauls. Pressure is maintained until the cement matrix has set. The strands may be oriented in a variety of machines and the invention should not be limited to any particular type of orienting mechanism. Orientation may be achieved by positioning the strands in groups on the cauls with the groups extending across the direction of movement of the caul. Also, the strands may be deposited in groups parallel to the direction of movement of the caul. A pressure of 50 to 500 p.s.i is satisfactory to press the boards to the desired thickness, normally substantially less than the original thickness when the strands are deposited on the caul. The pressure is maintained until the cement has set. Gypsum may be set within an hour, whereas, 24 hours may be necessary with some Portland cements.

While a single lamina may be made in which all of the strands are oriented as described, the invention also contemplates the use of a plurality of such laminations, each of which may be made in accordance with the present invention. In the case of three or more laminations, one or more of the inner laminations may have the strands therein oriented at right angles to the mean direction of the strands in the face laminations. The outer plies or laminations always have their strands in the same direction. In some applications it may be advantageous to have randomly disposed strands in the intermediate layers. When making a board of three plies or laminae, the strands of the first lamina are deposited on the caul in parallelism. The second or inner ply or lamina may then be deposited with its strands at right angles to the first, or the strands of the inner ply may be randomly disposed. The strands of the top ply are then deposited in parallel to those of the first ply. The assembled laminae so formed are then all subjected to consolidating pressure simultaneously.

As a specific example, of a product made in accordance with the present invention, a board was made using Douglas fir veneer strands having an average length of 2 inches, an average width of 1/10 inch, and an average thickness of .010 inch. The fibers of these strands were substantially parallel to the length of the strands. These strands were subjected to a leaching action by immersion in hot water, and after leaching and draining, they were fed to a mixer where dry Portland cement was added in the ratio 2½ pounds of cement to 1 pound of strands, dry basis. After thorough mixing, in which the cement formed coatings on the strands, the cement-coated strands were deposited on the upper edges of a bank of thin plates set on edge, which were spaced apart ⅜ of an inch. The strands were then brushed off the upper edges of the plates thereby falling substantially parallel to one another into the spaces between the plates. The strands so oriented fell on a caul positioned beneath the plates. The strands were deposited in a thickness adequate to produce a board thickness of .31 inch after the application of the consolidating pressure. A pressure of 125 pounds per square inch was maintained at a room temperature of about 75 degrees F. for a period of 20 hours. The board, which was then firm, was removed from the press and allowed to dry and cure for five days and was then tested in cross-bending as a simple beam.

In order to point up the advantageous results obtained by following the teachings herein, I have tested several cement boards in which the acute angle between crossing strands is within the claimed limits, as well as cement boards in which the angle of strand orientation is outside of the claimed limits. As was stated earlier a major purpose of this invention is to provide a cement board which compares with commercial plywood in its physical properties, especially stiffness. As some of the major uses of plywood and of the boards of this invention are for subflooring and roof decking and roof sheathing, where stiffness is of paramount importance, each of the panels were tested to determine the modulus of elasticity, an indication of stiffness.

FIGURE 10 illustrates the modulus of elasticity of the various cement boards tested as well as the modulus of elasticity of plywood panels. In their use as subflooring and for other structural uses plywood panels may be placed with the face plies extending either across or parallel to the supports. All of the panels were tested as a simple beam with a center load. A Douglas fir plywood panel having a nominal thickness of ½ inch was tested in both the strong way, with the grain of the core parallel to the length of span, and the weak way, with the grain of the core perpendicular to the length of span. The average modulus of elasticity for such a ½ inch Douglas fir plywood panel was 740,000 p.s.i. The average modulus of elasticity of all thicknesses tested, ranging from ⅜ inch to ¾ inch, was found to be substantially the same, namely 730,000 p.s.i. This value is graphically illustrated as bar G in FIGURE 10.

Bars A through F in FIGURE 10 illustrate the effect of strand orientation on the modulus of elasticity of the cement boards of this invention. The boards were tested with the orientation direction of the face strands parallel to the length of the span, that is across the supports. Each of the boards were ½ inch thick and were made with 2-inch hemlock strands. In each case the ratio of cement to strands was 2½ to 1, by weight. The boards had three plies with the face plies being oriented and the core having randomly disposed strands. The average specific gravity of each board was 1.12. The boards illustrated by bars A and D were constructed such that the oriented faces each contained 30% of the total material of the panel, whereas the boards illustrated by bars B, C and E were formed such that the face layers each contained 20% of the total material. The average modulus of elasticity of the boards tested was 900,000 p.s.i. This is to be compared with 730,000 p.s.i. for plywood.

It can be seen from a study of FIGURE 10 that the modulus of elasticity falls off considerably when the average angle of orientation becomes somewhat greater than on the order of about 40 degrees. Note that the modulus of elasticity for the board of bar E, having an average orientation angle of 46 degrees, is approximately 660,000 p.s.i., hence considerably less than the average modulus of elasticity of plywood. Bars A through D, representing board in which the average orientation angle is considerably less than about 40 degrees, have a modulus of elasticity greater than the average of plywood. For example, bar D representing an average angle of 16 degrees shows a modulus of elasticity of 830,000 p.s.i. The data shown graphically in FIGURE 10 illustrates that when the average orientation angle exceeds approximately 40 degrees the modulus of elasticity, and hence the stiffness of the board, has decreased to the point where the strength is below that of plywood. Additionally, note bar F showing a board in which all the strands are randomly disposed. The modulus of elasticity of this board is 310,000 p.s.i., hence considerably below the strength of plywood. This product is of the type disclosed in my earlier United States Patent No. 2,697,677.

It is thus apparent that the present invention produces a cement board having superior strength properties. The stiffness or modulus of elasticity is comparable to Douglas fir plywood. As the product is highly fire-resistant and can be manufactured at a very low cost it has definite basic advantages over plywood as a structural material for the building industry.

Whereas I have shown and described an operative form of the invention, it should be understood that this showing and description of the invention is to be taken in an illustrative or diagrammatic sense only. There are many modifications to the invention which will fall within the scope and spirit thereof and which will be apparent to those skilled in the art. The scope of the invention should be limited only by the scope of the hereinafter appended claims.

I claim:

1. A structural board including wood strands bonded together, the average length of the strands being at least three times greater than their average width, the strands having an average thickness in the range of .005 to .020 inch, the strands having an average length of at least one-half inch, but not greater than six inches, the fibers of the strands extending generally parallel to the surface and to the length of the strands, substantially all of the strands crossing at least one other strand at an acute angle, the average of all acute angles of strands that contact and cross each other being less than about 40 degrees, the average direction of the bisectors of the acute angles being substantially parallel to one edge of the board.

2. The structure of claim 1 further characterized in that said structural board has a density of between 0.6 and 0.95, with the binder used to bond the wood strands together comprising from two to 15 percent of the weight of the board.

3. The structure of claim 1 wherein the majority of the strands have a direction such that they make an acute angle of less than about 20 degrees with a line parallel to one edge of the board.

4. A structural board comprising at least three laminae bonded together, each lamina consisting of wood strands bonded together, the average length of the strands being at least three times greater than their average width, the strands having an average thickness in the range of .005 to .020 inch, the strands having an average length of at least one-half inch, but not greater than six inches, the fibers of the strands extending generally parallel to the surface and to the length of the strands, substantially all of the strands in both outer laminae crossing at least one other strand in the same lamina at an acute angle, the average of all acute angles of strands that contact and cross each other in said outer laminae being less than about 40 degrees, the average direction of the bisectors of said acute angles being substantially parallel to one edge of the board, the weight of the strands being substantially greater than the weight of the binder in the panel.

5. The structure of claim 4 further characterized in that the density of the face laminae is in the range of 0.6 to 0.95 with the density of the core being less than that of the face laminae.

6. The structure of claim 4 wherein the strands in an intermediate lamina extend transversely of the orientation of the strands of the face laminae.

7. The structure of claim 4 wherein the strands in an intermediate lamina are randomly distributed across the orientation of the strands in the face laminae.

8. The structure of claim 4 wherein the majority of the strands in both outer laminae have a direction such that they make an acute angle of less than about 20 degrees with a line parallel to one edge of the structural board.

9. A structure board comprising a cementitious matrix and straight wood strands embedded in the matrix, the average length of the strands being at least three times greater than their average width, the strands having an average thickness in the range of .005 to .020 inch, the strands having an average length of at least one-half inch, but not greater than six inches, the fibers of the strands extending generally parallel to the surface and to the length of the strands, substantially all of the strands crossing at least one other strand at an acute angle, the average of all acute angles of strands that contact and cross each other being less than about 40 degrees, the average direction of the bisectors of said acute angles being substantially parallel to one edge of the board, the weight of the strands being substantially less than the weight of the cementitious material.

10. The structure of claim 9 wherein the weight of the cement in the board is from two to ten times the weight of the strands in the board.

11. A structural board composed of three or more laminations, each including an inorganic cement and a plurality of straight wood strands embedded in said cement, the average length of the strands being at least three times greater than their average width, the strands having an average thickness in the range of .005 to .020 inch, the strands having an average length of at least one-half inch, but not greater than six inches, the fibers of the strands extending generally parallel to the surface and to the length of the strands, substantially all of the strands in both outer laminae crossing at least one other strand in the same lamina at an acute angle, the average of all acute angles of strands that contact and cross each other in said outer laminae being less than about 40 degrees, the average direction of the bisectors of said acute angles being substantially parallel to one edge of said board, the weight of the strands being substantially less than the weight of the inorganic cement.

12. The structure of claim 11 further characterized in that the strands in an intermediate lamina are randomly distributed across the orientation of the strands in the face laminae.

References Cited in the file of this patent

UNITED STATES PATENTS

| | | |
|---|---|---|
| 1,523,105 | Doe | Jan. 13, 1925 |
| 2,649,034 | Gramelspacher | Aug. 18, 1953 |
| 2,697,677 | Elmendorf | Dec. 21, 1954 |
| 2,773,789 | Clark | Dec. 11, 1956 |
| 2,854,372 | Yan et al. | Sept. 30, 1958 |
| 2,960,423 | Kreibaum | Nov. 15, 1960 |

OTHER REFERENCES

"Wood Fibers From Veneer Waste," by Elmendorf, pub. February 9, 1950, in "Paper Trade Journal," pp. 29–31.